G. F. DICKSON.
MANUFACTURE OF CANDY.
APPLICATION FILED DEC. 15, 1916.

1,239,167.

Patented Sept. 4, 1917.

Witness:
John Enders

Inventor:
George F. Dickson,
by Robert Burns
Atty.

UNITED STATES PATENT OFFICE.

GEORGE F. DICKSON, OF CHICAGO, ILLINOIS.

MANUFACTURE OF CANDY.

1,239,167.  Specification of Letters Patent.  Patented Sept. 4, 1917.

Application filed December 15, 1916. Serial No. 137,083.

*To all whom it may concern:*

Be it known that I, GEORGE F. DICKSON, a citizen of the United States of America, and a resident of Chicago, in the county of Cook, State of Illinois, have invented certain new and useful Improvements in Manufacture of Candy, of which the following is a specification.

This invention relates to the manufacture of that class of candy or confections in which a soft center or fondant of an edible creamy or pasty composition is inclosed within a coating of chocolate or like aromatic or flavoring material.

And the present improvement has for its object to provide a simple and efficient method or process by which the application of the external coating is attained in an expeditious and economical manner, and by which an attractive and high grade article is produced, all as will hereinafter more fully appear. In the accompanying drawing illustrating the hand method of carrying out the present improvement:—

Similar reference numerals indicate like parts in the several views.

Figure 1:
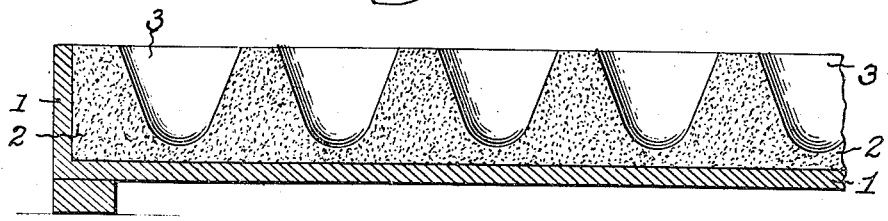
Figure 1, is a fragmentary section of a mold, illustrating the first step of the method or process.
Figure 2:
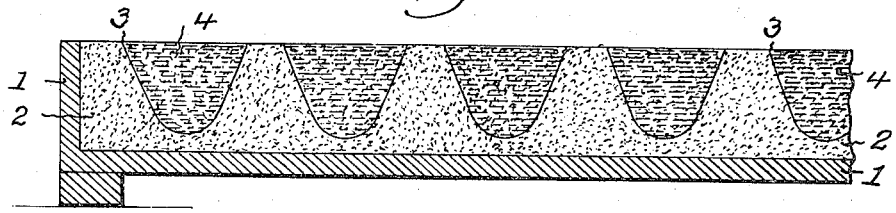
Figs. 2 and 3 are similar views illustrating two succeeding steps of the method or process.
Figure 3:
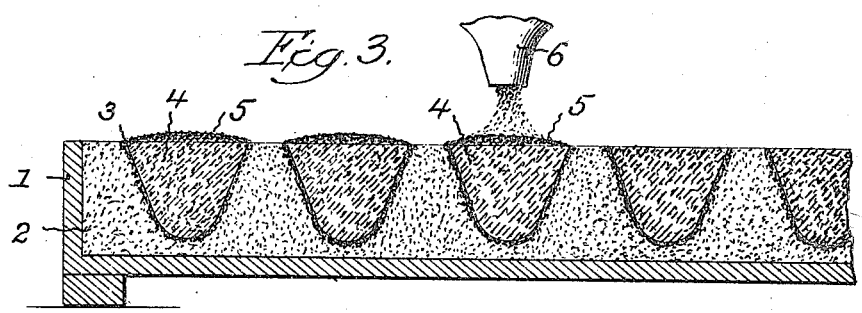

Referring to the drawing, 1 designates a mold board or tray preferably of the shallow open top form shown in Figs. 1, 2 and 3. 2 designates a loose filling of granulated aromatic or flavoring material, such as grated chocolate or grated chocolate and cocoa combined, and with which the mold board or tray 1 is filled, as shown.

As in the well known starch molding process now in general use in the confectionery art, the filling 2 aforesaid, is impressed with a series of mold cavities or depressions 3, by means of the usual pattern plate or board carrying a series of patterns, as illustrated in Fig. 1.

The succeeding step in the present improvement consists in filling the mold cavities or depressions 3 with a molten body 4 of the fondant or center forming material of the confection to be produced, as illustrated in Fig. 2.

The next step in the present improvement consists in coating the top surface of the still molten center 4 with a layer 5 of granulated chocolate or the like in any usual manner, as for instance by a sifting funnel 6 as illustrated in Fig. 6.

Figure 4:
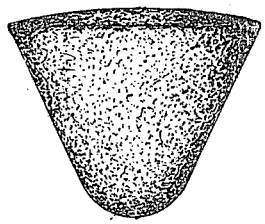
Figs. 4 and 5 are elevations of the articles produced, and showing respectively the rough coated and the smooth coated articles produced by the present improvement.
Figure 5:
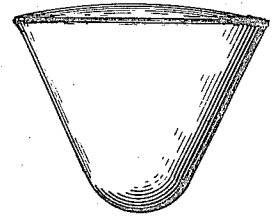

In the present improvement the molten center 4 is adapted to permeate more or less of the granulated material forming the walls of the mold cavities 3, as well as the top surface coating 5 aforesaid, so that when cooled in any usual manner, said coatings will adhere in a substantial manner to the aforesaid center 4, as a rough coating, as illustrated in Fig. 4. With the proper cooling of the article, and a subsequent removal in any usual manner, of any loose or surplus granular material constituting part of said coatings, the article is ready for wrapping or other packaging as a confection having a rough granular and attractive appearance. When however a smooth or glossy surfaced confection is desired, the additional step required therefor in the present improvement consists, in the exposure or passage of the rough coated article above described to or through a heating medium, whereby the coatings above described are fused and rendered smooth or glossy.

Having thus fully described my said invention, what I claim as new and desire to secure by Letters Patent, is:—

1. The herein described process of forming soft-center confections, the same comprising the formation of a mold cavity in loose granular flavoring material, and the filling of said cavity with a molten center the temperature of which will modify the properties of the materials of said center and wall of the mold cavity to effect an adhesion therebetween, substantially as set forth.

2. The herein described process of forming soft-center confections, the same comprising the formation of a mold cavity in loose granular flavoring material, the filling of said cavity with a molten center, and applying a coating of said granular flavoring material to the top surface of the molten center, the temperature of such center being adapted to modify the properties of the materials of said center, top coating and wall of the mold cavity to effect an adhesion therebetween, substantially as set forth.

3. The herein described process of forming soft-center confections, the same comprising the formation of a mold cavity in loose granular flavoring material, the filling of said cavity with a molten center the temperature of which will modify the properties of the materials of said center and walls of the mold cavity to effect an adhesion therebetween, and subsequently fusing the external coating thus formed, substantially as set forth.

4. The herein described process of forming soft-center confections, the same comprising the formation of a mold cavity in loose granular flavoring material, the filling of said cavity with a molten center, applying a coating of said granular flavoring material to the top surface of the molten center, the temperature of said center being adapted to modify the properties of the materials of said center, top coating and wall of the mold cavity to effect an adhesion therebetween, and finally fusing the external coating aforesaid, substantially as set forth.

5. The herein described process of forming soft-center confections, the same comprising the formation of a mold cavity in loose granular flavoring material, the filling of said cavity with molten center the temperature of which will modify the properties of the materials of said center and wall of the mold cavity to effect an adhesion therebetween, and the removal of any loose surplus granular material from the article after the same has cooled substantially as set forth.

6. The herein described process of forming soft-center confections, the same comprising the formation of mold cavity in loose granular flavoring material, the filling of said cavity with a molten center, applying a coating of said granular flavoring material to the top surface of the molten center, the temperature of said center being adapted to modify the properties of the materials of said center, top coating and wall of the mold cavity to effect an adhesion therebetween, and the removal of any loose surplus granular material from the article after same has been cooled, substantially as set forth.

7. The herein described process of forming soft-center confections, the same comprising the formation of a mold cavity in loose granular flavoring material, the filling of said cavity with a molten center, the temperature of which will modify the properties of the materials of said center and wall of the mold cavity to effect an adhesion therebetween, the removal of any loose surplus granular material from the article after same has cooled, and subsequently fusing the external coating aforesaid, substantially as set forth.

8. The herein described process of forming soft-center confections, the same comprising the formation of mold cavity in loose granular flavoring material the filling of said cavity with a molten center, applying a coating of said granular flavoring material to the top surface of the molten center, the temperature of said center being adapted to modify the properties of the materials of said center, top coating and wall of the mold cavity to effect an adhesion therebetween, the removal of any loose surplus granular material from the article after the same has cooled, and finally fusing the external coatings aforesaid, substantially as set forth.

Signed at Chicago, Illinois, this 2nd day of December, 1916.

GEORGE F. DICKSON.